3,136,796
WERNER COMPLEX COMPOUNDS OF CHROMIUM
AND POLYCARBOXYLIC ACIDS
John W. Trebilcock, Holiday Hills, Wilmington, Del.,
assignor to E. I. du Pont de Nemours and Company,
Wilmington, Del., a corporation of Delaware
No Drawing. Filed June 8, 1961, Ser. No. 115,598
4 Claims. (Cl. 260—438)

This invention relates to Werner complexes containing chromium.

Werner chromium complex compounds of the type disclosed in Iler U.S. Patent No. 2,273,040 issued February 17, 1942, are well known for their hydrophobic properties. For example, these known chromium complexes can advantageously be used to impart water resisting properties to a large variety of different materials such as leather, as is disclosed in copending application Robinson Serial No. 575,006 filed March 30, 1956, now Patent No. 3,102,772. The Iler complexes are made using monocarboxylic acids.

By contrast, the Werner complexes of the present invention are hydrophilic, thereby making them useful for many purposes where the other complexes are unsatisfactory.

The complex compounds of the present invention are Werner complexes of chromium with polycarboxylic acids having a total of from 6 through 24 carbon atoms. These acids are aliphatic or cyclic, the latter including both saturated, i.e., alicyclic, and unsaturated, i.e., aromatic. The aliphatic acids can be saturated or ethylenically unsaturated, and apart from the carboxyl substituents can be branched or straight chain. The alicyclic acids include cyclopentane and cyclohexane rings substituted with carboxyl or carboxymethyl groups. Aromatic acids include polycarboxylic benzene and naphthalene derivatives.

Acids within the scope of this invention have 3, 4, 5 or 6 carboxy groups. Tetracarboxylate dacids are preferred for their unusual properties and outstanding uses. Also preferred for their availability and excellent results are benzene derivatives and straight chain saturated hydrocarbons having a total of 8 through 12 carbons.

The complexes of this invention can be made by conventional procedures as will be readily understood in the art. Suitable procedures are described in the Iler patent referred to above, and also in U.S. Patents 2,524,-803; 2,544,666; 2,544,667; 2,544,668; 2,683,156; and 2,833,182.

For example, the complexes can be made by reaction in suitable solutions between the carboxylic acid and a basic chromium salt of a monobasic acid, preferably basic chromic chloride. Salts having anions other than chloride can be used. It is generally preferred to carry out the reaction by refluxing the ingredients in a suitable solvent such as isopropanol for a period of about 15 to 30 minutes, with the conditions as will be readily understood varying with the acid used. The resulting complex compound has trivalent nuclear chromium atoms coordinated with the acid groups and are not merely normal chromium salts but complexes of the Werner type.

A chromium to polycarboxylic acid mole ratio of 1:1 to about 10:1 can be used. A ratio of 2:1 is preferred. Also, a basicity of less than 50% is preferred, with the most preferred basicity being 33⅓% which corresponds to two chloride groups for each chromium group. For a discussion of basicity, see U.S. 2,544,666, column 5.

Among the suitable acids useful in the present invention can be mentioned for purposes of illustration and not limitation the following:

Aliphatic acids (saturated):
    Propane-1,2,3-tricarboxylic acid
    Butane-1,2,3,4-tetracarboxylic acid
    Butane-1,1,4,4-tetracarboxylic acid
    Butane-1,1,3,4-tetracarboxylic acid
    Propane-1,1,2,2,3-pentacarboxylic acid
    Propane-1,1,2,3,3-pentacarboxylic acid
    Butane-1,1,2,3,3-pentacarboxylic acid
    Butane-1,1,2,4,4-pentacarboxylic acid
    Propane-1,1,2,2,3,3-hexacarboxylic acid
    Pentane-1,1,3,3,5,5-hexacarboxylic acid Aliphatic acids (unsaturated):
    2-carboxyglutaconic acid (aconitic)
    Ethylenetetracarboxylic acid
    1-propylene-1,2,3,3-tetracarboxylic acid
    1-butene-1,2,3,4-tetracarboxylic acid Aromatic acids:
    1,2,3-benzenetricarboxylic acid (hemimellitic acid)
    1,2,4-benzenetricarboxylic acid (trimellitic acid)
    1,3,5-benzenetricarboxylic acid (trimesic acid)
    1,2,3,4-benzenetetracarboxylic acid (prehnitic acid)
    1,2,3,5-benzenetetracarboxylic acid (mellophanic acid)
    1,2,4,5-benzenetetracarboxylic acid (pyromellitic acid)
    1,2,3,4,5-benzenepentacarboxylic acid
    1,2,3,4,5,6-benzenehexacarboxylic acid (mellitic)

Cyclic acids:
    Cyclopropane-1,1,2-tricarboxylic acid
    Cyclopropane-1,2,3-tricarboxylic acid
    Cyclopropane-1,1,2,2-tetracarboxylic acid
    Cyclopropane-1,2,2,3-tetracarboxylic acid
    Cyclobutane-1,2,3-tricarboxylic acid
    Cyclopentane-1,2,3-tricarboxylic acid
    Cyclopentane-1,2,3,4-tetracarboxylic acid
    Cyclohex-5-ene-1,2,3,4-tetracarboxylic acid
    Cyclohexane-1,2,3,4-tetracarboxylic acid
    3 - carboxymethylcyclopentane - 1,2,4 - tricarboxylic acid Naphthalenic acids:
    Naphthalene-1,4,5,8-tetracarboxylic acid
    Naphthalene-1,2,4,5-tetracarboxylic acid Preferred compounds are 1,2,3,4-butanetetracarboxylic acid, mellitic acid and pyromellitic acid.

The Werner complexes of this invention can be used in place of the prior art chromium complexes as taught in the patents referred to above. Thus, a variety of materials can be treated with the complexes of this invention to impart desired properties. Such materials include ceramics; vitreous masses; glass including glass fibers and flakes; cellulose in such forms as wood, paper, cotton, hemp, cellophane, rayon, cellulose acetate and the like; polyamides such as wool, silk, gelatin, synthetic protein fibers, leather and hides. Also included are solid materials bearing oxide or hydroxide film such as can occur on metals.

The invention complexes are particularly useful in the treatment of glass for inclusion in reinforced plastic laminates and other articles. Because of the economic importance of fast wetting of the treated glass with the highly polar resins, the hydrophilic characteristics of the present complexes are significantly advantageous.

These complexes are of unique usefulness in the printing industry where they can be used to treat metal, plastic or cellulosic surfaces to render selective areas hydrophilic with resulting selective attraction for aqueous inks, paints, dyes, and the like. Subsequent selective coatings can then be made rapidly and uniformly, with excellent permanency and adherence. Printing elements are non-smearing and wear-resistant with outstanding life as shown by wear and de-anchoring tests.

The complexes of this invention are furthermore advantageous in that they reduce static buildup on plastic films and fibers such as polyethylene and synthetic fibers.

The complexes of this invention are preferably applied to the surface to be treated from a dilute alcohol solution, preferably in the range of 0.1 to 10% of the complex commodity in isopropanol. It is most preferred that the concentration of the complex commodity in isopropanol be less than 5%. The complex can be applied from an aqueous solution if desired.

The treating solution can be applied to the surface to be treated in any suitable manner such as by spraying, brushing or dipping the surface into a quantity of the solution. In treating films, fabrics and similar materials a preferred procedure comprises passing a length of the material into a treating bath containing the desired concentration of complex and then through squeeze rolls to adjust the liquid pickup of the material.

The invention will be further described but is not intended to be limited by the following examples, which illustrate the preparation and use of representative complex compounds of the present invention.

*Example 1*

To 136 g. of basic chromic chloride containing 7.65% chromium and 5.63% water is added 25.4 g. of pyromellitc acid (1,2,4,5-benzene tetracarboxylic acid) and 12 g. of isopropanol. This mixture is poured into a flask fitted with a heating mantle and reflux condenser, heated to 79° C. and held at reflux for 15 minutes at 79° C. The complex formed is cooled to room temperature. The final complex solution is clear, blue-green in color and contains 5.99% chromium.

*Example 2*

To 235 g. of basic chromic chloride containing 7.65% chromium and 5.63% water is added 40.5 g. of butane-1,2,3,4-tetracarboxylic acid and 24.5 g. of isopropanol. This mixture is heated to reflux at 78° C. and held at that temperature for 10 minutes and then cooled. The final complex solution contains 6.01% chromium and is soluble in water.

*Example 3*

To 735 g. of basic chromic chloride containing 8.16% chromium and 23.9% water is added 100 g. of aconitic acid (2-carboxyglutaconic acid) and 165 g. of distilled water. This mixture is poured into a flask fitted with a heating mantle and reflux condenser and refluxed at 76° C. for 15 minutes. The final complex solution has a clear bluish-green color and is easily dissolved in water and isopropanol.

*Example 4*

A chrome complex of naphthalene-1,4,5,8-tetracarboxylic acid is prepared as follows: To 137 g. of basic chromic chloride containing 7.6% chromium and 3.5% water is added 30.4 g. of the acid and 180 g. of isopropanol. This mixture is poured into a flask fitted with a heating mantle and reflux condenser and refluxed at 79° C. for 30 minutes and cooled. The complex solution is green in color and contains 3.03% chromium.

*Example 5*

To 137 g. of basic chromic chloride containing 7.6% chromium and 3.5% of water is added 26 g. of 3-carboxymethylcyclopentane-1,2,4-tricarboxylic acid and 10 g. of isopropanol. This mixture is refluxed at 78° C. for 15 minutes and cooled to room temperature. The complex solution is found to be soluble in water and isopropanol.

*Example 6*

To 132 g. of basic chromic chloride containing 7.89% chromium and 24.9% water is added 24.2 g. of 1,2,3,4,5,6-benzene hexacarboxylyic acid and 7 g. of water. This mixture is refluxed at 79° C. for 30 minutes and cooled to room temperature. The complex contains 5.97% chromium and is soluble in water.

*Example 7*

To 132 g. of basic chromic chloride containing 7.89% chromium and 24.9% water is added 24.6 g. of cyclopentane-1,2,3,4-tetracarboxylic acid and 16 g. of isopropanol. This mixture is poured into a flask fitted with a heating mantle and refluxed at 77° C. for 15 minutes. The complex formed is cooled to room temperature. The final complex solution is clear, blue-green in color and contains 6.02% chromium.

*Example 8*

Two percent solutions of the chrome complexes of pyromellitic acid and butanetetracarboxylic acid are prepared by adding 20 g. of the complexes prepared in the above examples to 980 g. of isopropanol. Samples of polyethylene film, "Mylar" polyester film and aluminum foil are dipped in each of the solutions for 30 seconds, drained and air dried. In addition, each of the solutions is painted on the aluminum foil side of aluminum foil laminated to paper and also on the polyethylene side of polyethylene coated paper and air dried. Samples of each of the treated substrates and their respective controls similarly treated with only isopropanol are inclined on a 45° plane and drops of water are placed on the surface using a medicine dropper. In all cases the drop of water either rolls off the surface treated with only isopropanol cleanly or leaves a few scattered small drops. The water placed on the complex treated substrates, however, wets the substrate and drains down the inclined plane leaving a wetted trail, showing that the surface is hydrophilic. Similar results are found with water dyed with methylene blue. This illustrates that the complex treatment aids the wetting of the surface with water or water-based substances, such as inks.

*Example 9*

Two percent solutions in isopropanol of the chrome complexes prepared in Examples 1–7 are prepared by adding 4 g. of the complex to 196 g. of isopropanol. Squares or coupons of the following substrates are prepared for testing by either wiping the surface with isopropanol or dipping in isopropanol and air drying: plate glass, "Lucite" acrylic resins, a painted metal surface, cellulose acetate sheeting, copper, brass, galvanized iron, stainless steel, Inconel and tempered hardboard. When the above-mentioned solutions are painted on each of the substrates and air dried, testing with water reveals that the wetting of the treated substrates is improved. The surfaces so treated are markedly more receptive to printing and painting with water-based inks and paints.

*Example 10*

One percent solutions of the chrome complexes of pyromellitic acid, butane tetracarboxylic acid and mellitic acid are prepared by adding 10 g. of the complex commodity prepared in Examples 1, 2 and 6 above to 990 g. of isopropanol. Thin polyethylene sheeting (0.0005 in. thick) of the type normally used by dry cleaners to cover dry cleaned clothes is dipped into each of the solutions, drained and air dried. The treated polyethylene sheeting exhibits significantly less static buildup when compared to the untreated polyethylene.

The invention claimed is:

1. A Werner complex compound of chromium and a polycarboxylic acid having from 3 through 6 carboxyl groups and a total of 6 through 24 carbon atoms, said acid being selected from the group consisting of saturated and ethylenically unsaturated aliphatic acids, alicyclic acids, and aromatic acids, and having as the sole functional groups on said acid substituents selected from the group consisting of carboxyl and carboxymethyl groups.

2. A Werner complex compound of chromium and 1,2,3,4-butanetetracarboxylic acid.

3. A Werner complex compound of chromium and mellitic acid.

4. A Werner complex compound of chromium and pyromellitic acid.

References Cited in the file of this patent

UNITED STATES PATENTS

| | | |
|---|---|---|
| 2,275,211 | Urbain et al. | Mar. 3, 1942 |
| 2,315,259 | Hyde | Mar. 30, 1943 |
| 2,700,010 | Balz | Jan. 18, 1955 |
| 2,894,967 | Gilkey | July 14, 1959 |
| 2,909,545 | Barnhart | Oct. 20, 1959 |